(12) United States Patent
Shadrin et al.

(10) Patent No.: US 10,437,502 B2
(45) Date of Patent: Oct. 8, 2019

(54) EFFICIENT DEDUPLICATION OF LOGICAL UNITS

(71) Applicant: EMC Corporation, Hopkinton, MA (US)

(72) Inventors: Alexander Valentinovich Shadrin, St. Petersburg (RU); Vitaly Stanislavovich Kozlovsky, St. Petersburg (RU); Ivan Valentinovich Gumenyuk, St. Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 15/115,890

(22) PCT Filed: Dec. 29, 2015

(86) PCT No.: PCT/RU2015/000949
§ 371 (c)(1),
(2) Date: Aug. 1, 2016

(87) PCT Pub. No.: WO2017/116264
PCT Pub. Date: Jul. 6, 2017

(65) Prior Publication Data
US 2018/0039442 A1 Feb. 8, 2018

(51) Int. Cl.
*G06F 12/08* (2016.01)
*G06F 3/06* (2006.01)
(Continued)

(52) U.S. Cl.
CPC ............ *G06F 3/0641* (2013.01); *G06F 3/067* (2013.01); *G06F 3/0608* (2013.01);
(Continued)

(58) Field of Classification Search
None
See application file for complete search history.

(56) References Cited

U.S. PATENT DOCUMENTS 5,153,879 A * 10/1992 Tanaka .................. G06F 3/0601
369/59.25
5,355,450 A * 10/1994 Garmon ................ G06F 3/0219
345/501

(Continued)

OTHER PUBLICATIONS

Dell EMC SAN Configurations; Mehis 2004 (Year: 2004).*

(Continued)

*Primary Examiner* — Reginald G Bragdon
*Assistant Examiner* — Paul M Knight
(74) *Attorney, Agent, or Firm* — BainwoodHuang

(57) ABSTRACT

Systems and methods for efficient deduplication and/or provisioning of LUNs are disclosed. A first unique data block pool for a first LUN of a plurality of deduplicated LUNs is accessed, the first unique data block pool comprising a first plurality of unique data blocks for representing data stored on the first LUN. A second unique data block pool for a second LUN of the plurality of LUNs is accessed, the second unique data block pool comprising a second plurality of unique data blocks for representing data stored on the second LUN. It is determined a correspondence metric for the first unique data block pool and the second unique data block pool exceeds a pre-determined threshold. The first LUN and the second LUN are joined to form a first combined LUN. The first unique data block pool and the second unique data block pool are joined.

18 Claims, 5 Drawing Sheets

(51) Int. Cl.
*G06F 12/0802* (2016.01)
*G06F 16/00* (2019.01)

(52) U.S. Cl.
CPC ........ *G06F 3/0665* (2013.01); *G06F 12/0802* (2013.01); *G06F 16/00* (2019.01)

(56) References Cited

U.S. PATENT DOCUMENTS

| | | | | |
|---|---|---|---|---|
| 5,960,451 | A * | 9/1999 | Voigt | G06F 3/0605 360/902 |
| 6,745,311 | B2 * | 6/2004 | Fabrizio | G01K 7/01 374/E7.035 |
| 7,032,136 | B1 * | 4/2006 | Gajjar | G06F 11/263 714/42 |
| 7,831,793 | B2 | 11/2010 | Chakravarty et al. | |
| 8,156,306 | B1 | 4/2012 | Raizen et al. | |
| 9,207,881 | B1 * | 12/2015 | Haase | G06F 3/0689 |
| 9,213,494 | B1 * | 12/2015 | Yueh | G06F 3/0608 |
| 9,619,479 | B1 * | 4/2017 | Zhang | G06F 17/30156 |
| 2004/0049564 | A1 * | 3/2004 | Ng | H04L 41/0896 709/223 |
| 2006/0259727 | A1 * | 11/2006 | Thomas | G06F 3/0607 711/165 |
| 2008/0162779 | A1 * | 7/2008 | Morris | G06F 3/061 711/100 |
| 2010/0082558 | A1 * | 4/2010 | Anglin | G06F 3/0604 707/694 |
| 2012/0151169 | A1 * | 6/2012 | Mori | G06F 3/061 711/166 |
| 2013/0042083 | A1 * | 2/2013 | Mutalik | G06F 17/30162 711/162 |
| 2013/0282980 | A1 * | 10/2013 | Bennett | G06F 3/0689 711/114 |
| 2014/0032925 | A1 * | 1/2014 | Panchbudhe | G06F 3/0608 713/189 |
| 2014/0281306 | A1 * | 9/2014 | Nakajima | G06F 3/0647 711/162 |
| 2014/0325141 | A1 * | 10/2014 | Liu | G06F 12/0246 711/112 |
| 2015/0227602 | A1 * | 8/2015 | Ramu | G06F 16/27 707/634 |

OTHER PUBLICATIONS

Introduction to the EMC VNX2 Series; EMC 2014 (Year: 2014).*
Implementing IBM Deduplication; Osuna 2011 (Year: 2011).*
What is a storage pool; Rath, Quora Jan. 2015 (Year: 2015).*
LUN management at the heart of SAN configuration 2007 (Year: 2007).*
VNX Deduplication White Paper; VNX 2012 (Year: 2012).*
What is the difference between a LUN and a Volume; 2013 (Year: 2013).*
Decentralized Deduplication in SAN Cluster File Systems by Clements (Year: 2009).*

* cited by examiner

EFFICIENT DEDUPLICATION OF LOGICAL UNITS

CROSS-REFERENCE TO RELATED APPLICATIONS

This application is a national stage application under 35 U.S.C. § 371 of international application no. PCT/RU2015/000949, filed Dec. 29, 2015, which is hereby incorporated by reference in its entirety.

FIELD OF THE TECHNOLOGY

The present technology relates generally to data storage systems and, more specifically, to efficient deduplication of logical units.

BACKGROUND

In some applications, a storage system can provide storage to a connected host system. Examples of such storage systems include the storage systems produced by EMC Corporation of Massachusetts. The storage system can provide a logical storage device (logical unit or LUN) for the host, such that the host can read data from and write data to the LUN. Applications executing on the host can use the LUN as, for example, they would a dedicated physical storage device. The physical storage for the LUN can be provisioned from one or more of the physical storage devices (e.g., magnetic disk drives, solid state drives ("SSDs"), etc.) of the storage system, and the storage system can manage on which physical storage devices data from the LUN are stored in a manner transparent to the host. In some applications, deduplication techniques can be applied to a LUN in order to reduce the amount of space used for storing the LUN's data. Conventional approaches to deduplication for a LUN can lead to inefficient resource utilization.

SUMMARY OF THE TECHNOLOGY

Accordingly, there is a need for efficient deduplication of LUNs. In one aspect, there is a storage system. The storage system includes a first storage processor. The storage system includes one or more disk enclosures including a plurality of disk units forming a plurality of deduplicated logical units (LUNs), wherein the disk enclosure is in data communication with the first storage processor. The first storage processor is configured to maintain a first unique data block pool for a first LUN of the plurality of LUNs, the first unique data block pool including a first plurality of unique data blocks for representing data stored on the first LUN. The first storage processor is configured to maintain a second unique data block pool for a second LUN of the plurality of LUNs, the second unique data block pool including a second plurality of unique data blocks for representing data stored on the second LUN. The first storage processor is configured to determine a correspondence metric for the first unique data block pool and the second unique data block pool exceeds a pre-determined threshold. The first storage processor is configured to join the first LUN and the second LUN to form a first combined LUN. The first storage processor is configured to join the first unique data block pool and the second unique data block pool to form a third unique data block pool including a unique data block for each unique data block from a set of data blocks including the first plurality of unique data blocks and the second plurality of unique data blocks.

In some embodiments, the first storage processor is configured to maintain a fourth unique data block pool for a fourth LUN of the plurality of LUNs, the fourth unique data block pool including a fourth plurality of unique data blocks for representing data stored on the fourth LUN; determine a correspondence metric for the third unique data block pool and the fourth unique data block pool exceeds the pre-determined threshold; join the first combined LUN and the fourth LUN to form a second combined LUN; and join the third unique data block pool and the fourth unique data block pool.

In some embodiments, the first storage processor is configured to maintain the first unique data block pool for the first LUN in response to receiving data for writing to the first LUN. In some embodiments, the first storage processor is configured to maintain the first unique data block pool for the first LUN in response to a periodic trigger. In some embodiments, the first storage processor is configured to join the first LUN and the second LUN, and join the first unique data block pool and the second unique data block pool in response to user input. In some embodiments, the pre-determined threshold is 50%. In some embodiments, the storage processor is further configured to: determine a first utilization of the first LUN; determine a second utilization of the second LUN; join the first LUN and the second LUN to form the first combined LUN provided that the first utilization is below a first utilization threshold and the second utilization is below a second utilization threshold.

In another aspect, there is a storage system. The storage system includes a first storage processor. The storage system includes one or more disk enclosures including a plurality of disk units forming a plurality of logical units (LUNs), wherein the disk enclosure is in data communication with the first storage processor. The first storage processor, in response to deduplication being enabled, is configured to determine a first unique data block pool for a first LUN of the plurality of LUNs, the first unique data block pool including a first plurality of unique data blocks for representing data stored on the first LUN. The first storage processor, in response to deduplication being enabled, is configured to determine a second unique data block pool for a second LUN of the plurality of LUNs, the second unique data block pool including a second plurality of unique data blocks for representing data stored on the second LUN. The first storage processor, in response to deduplication being enabled, is configured to determine a correspondence metric for the first unique data block pool and the second unique data block pool exceeds a pre-determined threshold. The first storage processor, in response to deduplication being enabled, is configured to join the first LUN and the second LUN to form a first combined LUN. The first storage processor, in response to deduplication being enabled, is configured to join the first unique data block pool and the second unique data block pool to form a third unique data block pool including a unique data block for each unique data block from a set of data blocks including the first plurality of unique data blocks and the second plurality of unique data blocks.

In some embodiments, the first storage processor can be configured to: determine a fourth unique data block pool for a fourth LUN of the plurality of LUNs, the fourth unique data block pool including a fourth plurality of unique data blocks for representing data stored on the fourth LUN; determine a correspondence metric for the third unique data block pool and the fourth unique data block pool exceeds the pre-determined threshold; join the first combined LUN and the fourth LUN to form a second combined LUN; and join the third unique data block pool and the fourth unique data block pool.

In some embodiments, the first storage processor is configured to join the first LUN and the second LUN, and join the first unique data block pool and the second unique data block pool in response to user input. In some embodiments, the pre-determined threshold is 50%. In some embodiments, the storage processor is configured to: determine a first utilization of the first LUN; determine a second utilization of the second LUN; and join the first LUN and the second LUN to form the first combined LUN provided that the first utilization is below a first utilization threshold and the second utilization is below a second utilization threshold.

In another aspect, there is a method. The method includes accessing, by the storage system, a first unique data block pool for a first LUN of a plurality of deduplicated LUNs, the first unique data block pool including a first plurality of unique data blocks for representing data stored on the first LUN. The method includes accessing, by the storage system, a second unique data block pool for a second LUN of the plurality of LUNs, the second unique data block pool including a second plurality of unique data blocks for representing data stored on the second LUN. The method includes determining, by the storage system, a correspondence metric for the first unique data block pool and the second unique data block pool exceeds a pre-determined threshold. The method includes joining, by the storage system, the first LUN and the second LUN to form a first combined LUN. The method includes joining, by the storage system, the first unique data block pool and the second unique data block pool to form a third unique data block pool including a unique data block for each unique data block from a set of data blocks including the first plurality of unique data blocks and the second plurality of unique data blocks.

In some embodiments, the method includes accessing, by the storage system, a fourth unique data block pool for a fourth LUN of the plurality of LUNs, the fourth unique data block pool including a fourth plurality of unique data blocks for representing data stored on the fourth LUN; determining, by the storage system, a correspondence metric for the third unique data block pool and the fourth unique data block pool exceeds the pre-determined threshold; joining, by the storage system, the first combined LUN and the fourth LUN to form a second combined LUN; and joining, by the storage system, the third unique data block pool and the fourth unique data block pool.

In some embodiments, joining the first LUN and the second LUN, and joining the first unique data block pool and the second unique data block pool is in response to user input. In some embodiments, the pre-determined threshold is 50%. In some embodiments, the method includes: determining, by the storage system, a first utilization of the first LUN; determining, by the storage system, a second utilization of the second LUN; and joining, by the storage system, the first LUN and the second LUN to form the first combined LUN provided that the first utilization is below a first utilization threshold and the second utilization is below a second utilization threshold.

In another aspect, there is a method. The method includes accessing, by the storage system, a first unique data block pool for a first LUN of a plurality of deduplicated LUNs, the first LUN utilized by a first application, and the first unique data block pool including a first plurality of unique data blocks for representing data stored on the first LUN. The method includes accessing, by the storage system, a second unique data block pool for a second LUN of the plurality of LUNs, the second LUN utilized by a second application, and the second unique data block pool including a second plurality of unique data blocks for representing data stored on the second LUN. The method includes determining, by the storage system, a correspondence metric for the first unique data block pool and the second unique data block pool exceeds a pre-determined threshold. The method includes assigning, by the storage system, the first application to utilize the second LUN.

In some embodiment, the method includes moving, by the storage system, data associated with the first application to the second LUN; and joining, by the storage system, the first unique data block pool and the second unique data block pool to form a third unique data block pool including a unique data block for each unique data block from a set of data blocks including the first plurality of unique data blocks and the second plurality of unique data blocks. In some embodiments, the method includes determining, by the storage system, a first utilization of the first LUN; determining, by the storage system, a second utilization of the second LUN; and assigning, by the storage system, the first application to utilize the second LUN provided that the first utilization is below a first utilization threshold and the second utilization is below a second utilization threshold.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The present technology relates to efficient deduplication of LUNs. Some storage system applications use deduplication to reduce the amount of storage space used to store the LUNs data. Deduplication can be done on a block-level, where each block is a fixed or dynamic size (e.g., 8 Kbytes, 16 Kbytes, 512 Kbytes). These blocks can be referred to as atomic because they will not be further divided into smaller blocks for deduplication purposes. A pool of unique data blocks is maintained for a LUN, where the pool includes one instance of each unique atomic data block that appears in the LUN's data. Larger collections of data (e.g., data structures, files, or parts thereof) can be represented by metadata including a table of pointers that reference the unique blocks in the unique data block pool. This can facilitate greater storage space efficiency because one instance of each unique data block can be stored for the entire LUN rather than storing a separate copy of each data block each time it appears in, e.g., a file. In some applications, deduplication (e.g., replacing data blocks with pointers to the corresponding unique data blocks in the unique data block pool) can be performed on incoming write data streams (e.g., inline), once data is written to physical storage (e.g., online), or according to some periodic schedule (e.g., offline).

When processing read requests, the storage system can restore, e.g., files based on their metadata. For example, when reading a file, or a portion thereof, the storage system can utilize the table of pointers. For each pointer to a unique data block, a copy of the referenced unique data block can be place in a buffer, thus reconstructing the original file.

Exemplary Storage System Environment

Figure 1:
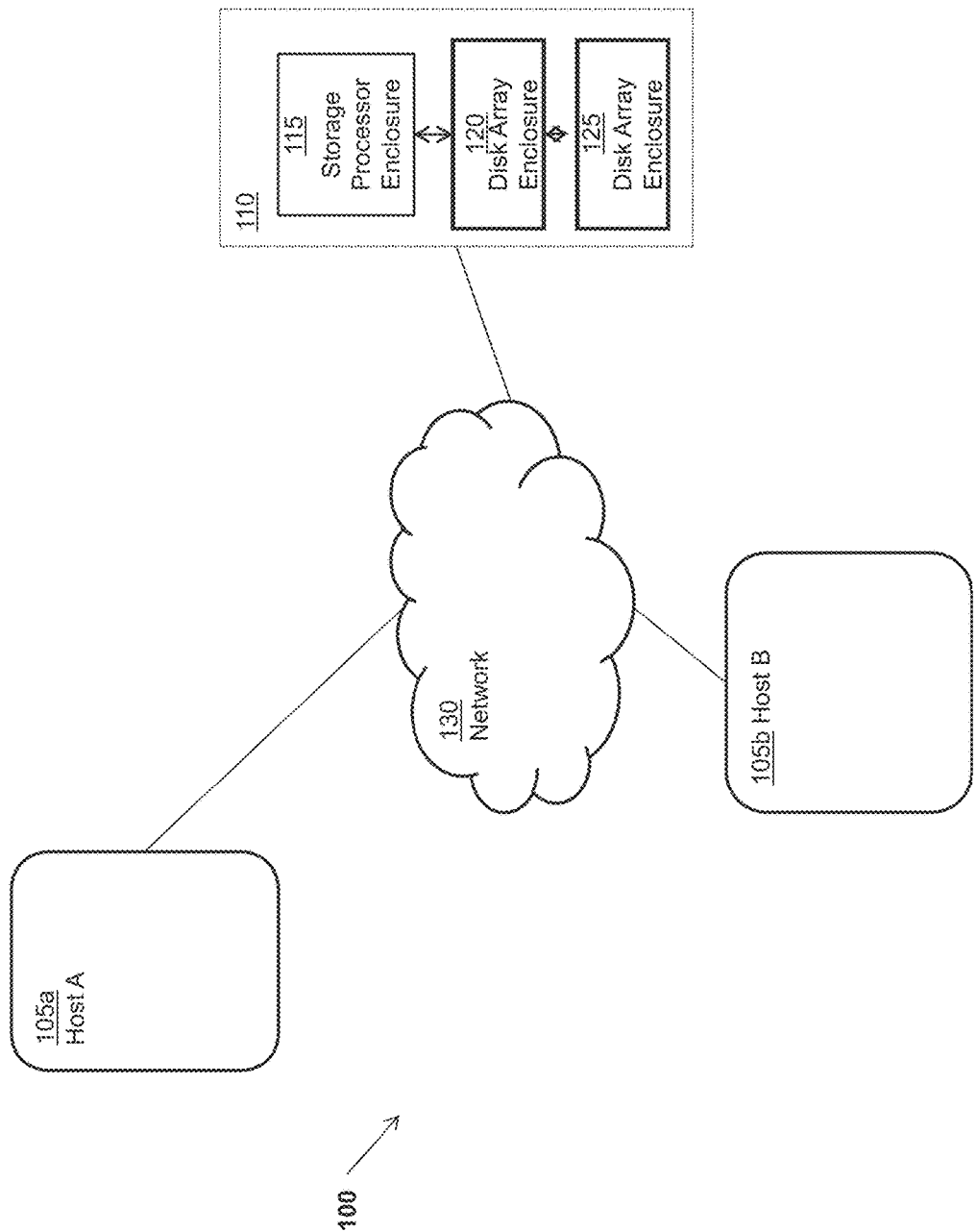
FIG. 1 depicts a system in which the technology can be implemented.

FIG. 1 depicts system 100 in which the technology can be implemented. System 100 includes host 105a and host 105b. Host 105a and host 105b can each be a computing device, such as a server, or a virtual machine executing a virtual environment on a server. Storage system 110 includes storage processor enclosure 115. Storage processor enclosure 115 can include one or more storage processors. The storage processors can be any computing devices, such as servers, blade servers, etc. Storage system 110 includes disk array enclosure 120 and disk array enclosure 125. Disk array enclosures 120 and 125 can include any form of physical storage devices, such as magnetic disk drives, flash memory drives, SSDs, etc. In the illustrated embodiment, storage processor enclosure 115 is connected to disk array enclosure 120, which is connected to disk array enclosure 125. The storage processors can read data from and write data to the storage devices in disk array enclosure 120 and disk array enclosure 125. Host 105a and host 105b can be connected to storage system 110 via network 130. The illustrated connections can each be any type of connection for communicating data. In general, the storage processors in storage processor enclosure 115 service I/O requests (e.g., commands to read data from or write data to storage system 110) received from host 105a and host 105b.

It should be appreciated that system 100 is an exemplary system in accordance with the technology. Other configurations are contemplated. For example, in some embodiments, the storage processors and disk enclosures can be in the same or different enclosures. In some embodiments, more or fewer disk array enclosures can be connected to the storage processors in the storage processor enclosure.

Figure 2:
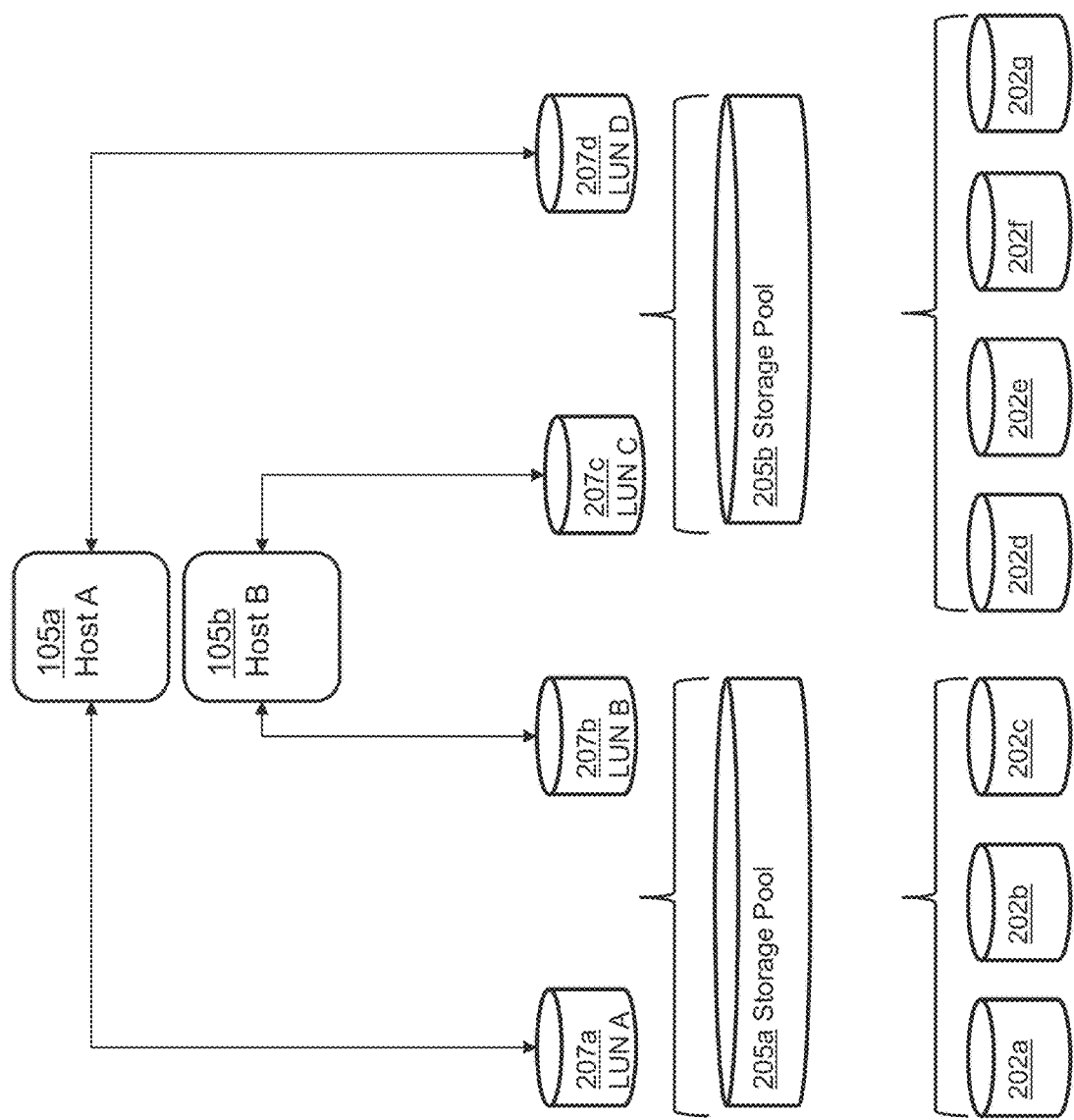
FIG. 2 depicts exemplary logical relationships between hardware in a storage system and logical storage system objects.

As described herein, storage system 110 can provide logical storage devices to host 105a and host 105b, such that host 105a and host 105b can write data to and read data from the logical devices. FIG. 2 depicts exemplary logical relationships between hardware in storage system 110 and logical storage system objects, including LUNs. Storage system 110 can include one or more physical storage devices 202a-202g (e.g., SSDs or magnetic disk drives in disk enclosure 120 or disk enclosure 125). Storage system 110 can include one or more logical storage system objects, including storage pools 205a and 205b, and LUNs 207a-207d. The illustrated logical relationships can be used to provide LUNs for host 105a and host 105b. Storage system 110 can include hardware, firmware, and/or software to implement the illustrated logical relationships.

As illustrated in FIG. 2, storage pool 205a can be formed from hardware storage devices 202a-202c (e.g., physical storage devices). For example, the storage space of one or more of hardware storage devices 202a-202c can be added to storage pool 205a, making the storage space from one or more of hardware storage devices 202a-202c available to be provisioned from storage pool 205a. LUNs 207a and 207b can be formed on storage pool 205a. For example, a portion of the storage space from storage pool 205a (which in turn is physical storage space from one or more of hardware storage devices 202a-202c) can be provisioned and/or assigned to LUN 207a and a portion of the storage space from storage pool 205a (which in turn is storage space from one or more of hardware storage devices 202a-202c) can be provisioned and/or assigned to LUN 207b. LUNs 207c-207d can be similarly provisioned from storage pool 205b (which in turn is storage space from one or more of hardware storage devices 202d-202g).

LUNs 207a-207e are logical storage devices that can be used by host 105a and host 105b for data storage and retrieval. Storage system 110 can maintain logical mappings between the address spaces of LUNs 207a-207d and storage devices 202a-202g. In some embodiments, provisioning storage space in a storage pool for a LUN can include creating the mapping between the virtual volume's address space and the storage pool's address space. As an example of the operation of storage system 110 providing the illustrated logical arrangement, if host 105a writes data to LUN 207a to be stored at a logical address on LUN 207a, the data can be stored on portions of hardware storage devices 202a-202c that are assigned to LUN 207a via storage pool 205a and mapped to the logical address. As another example, if host 105a reads data from LUN 207d from a logical address on LUN 207d, the data can be read from portions of hardware storage devices 202d-202g that are assigned to LUN 207d via storage pool 205b and mapped to the logical address. Host 105b can similarly access LUN 207b and LUN 207c.

It should be appreciated that logical relationships illustrated in FIG. 2 are exemplary logical relationships in accordance with the technology. Other relationships are contemplated. For example, one or more additional layers of virtualization and/or abstraction can be utilized by a storage system in providing logical storage devices.

Efficient Deduplication

Figure 3:
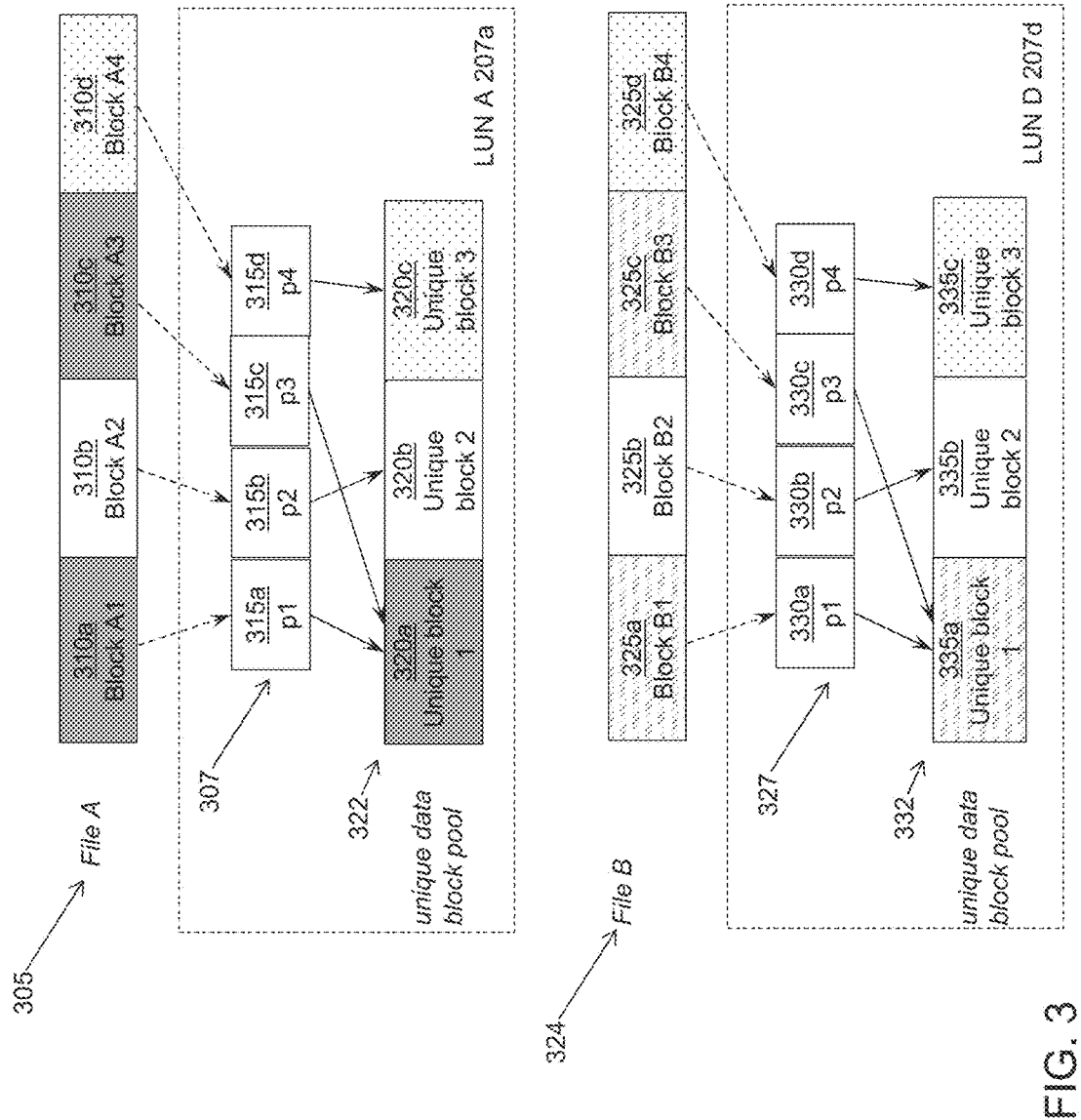
FIG. 3 illustrates exemplary data on deduplicated LUNs.

FIG. 3 illustrates exemplary data on deduplicated LUN 207a and deduplicated LUN 207d. In the illustrated example, file 305 includes data blocks 310a-310d. When stored on LUN 207a, file 305 is represented by table 307. Table 307 contains pointers that reference unique data blocks 320a-320c in unique data block pool 322 that are the same as the data blocks in file 305. For example, data block 310a of file 305 is the same as unique data block 320a, data block 310b of file 305 is the same unique data block 320b, data block 310c of file 305 is the same as unique data block 320a, and data block 310d of file 305 is the same as unique data block 320c. As a result of deduplication, table 307 contains pointer 315a that references unique data block 320a to indicate the first data block of file 305 is the same as unique data block 320a. Table 307 contains pointer 315b that references unique data block 320b to indicate the second data block of file 305 is the same as unique data block 320b. Table 307 contains pointer 315c that references unique data block 320a to indicate the third data block of file 305 is the same as unique data block 320a. Table 307 contains pointer 315d that references unique data block 320c to indicate the fourth data block of file 305 is the same as unique data block 320c. Beneficially, this arrangement can reduce the amount of storage required on LUN 207a to store file 305. For example, a single instance of unique data block 320a can be stored on LUN 207a and referenced each time it appears in a file (e.g., pointers 315a and 315c) instead of storing multiple copies of identical data. Additional space efficiency gains can be achieved when other files on LUN 207a are represented by pointers that reference unique data blocks in unique data block pool 322.

File 324 includes data blocks 325a-325d. When stored on LUN 207d, file 324 is represented by table 327. Table 327 contains pointers that reference unique data blocks 335a-335c in unique data block pool 332 that are the same as the data blocks in file 324. For example, data block 325a of file 324 is the same as unique data block 335a, data block 325b of file 324 is the same as unique data block 335b, data block 325c of file 324 is the same as unique data block 335a, and data block 325d of file 324 is the same as unique data block 335c. As a result of deduplication, table 327 contains pointers 330a-330d that references unique data block 335a-335c in a manner similar to that described above with respect to table 307.

The present technology can be implemented as software and/or hardware on a storage system to facilitate obtaining storage space efficiency gains by determining which LUNs can be joined to increase storage efficiency. In some applications, the technology can facilitate efficiently provisioning LUNs by determining whether LUNs can be combined to reduce the amount of storage space required. In some embodiments, the technology analyzes the unique data block pools for LUNs to identify the correspondence between unique data block pools. For example, the technology can analyze the unique data block pool of a first LUN, L1, to determine its correspondence with the unique data block pool of a second LUN, L2. The percentage of the unique data blocks in the unique data block pool of LUN L1 that also appear in the unique data blocks in the unique data block pool of LUN L2 can be referred to as the correspondence of the unique data block pool of LUN L1 to the unique data block pool of LUN L2. If the correspondence between two the unique data block pools of two LUNs is above a threshold (e.g., 25%, 50%, or other threshold), space efficiency can be gained by joining the two LUNs and joining their respective unique data storage block pools (eliminating any duplicate data blocks in the combined pool).

In some implementations, the technology can evaluate the potential combination of LUNs for performance degradation. For example, the technology can determine an I/O load for each LUN. If either I/O load is above a threshold or the two IO loads in combination are above a threshold, the technology can determine not to combine the LUNs due to the predicted impact on performance.

Figure 4:
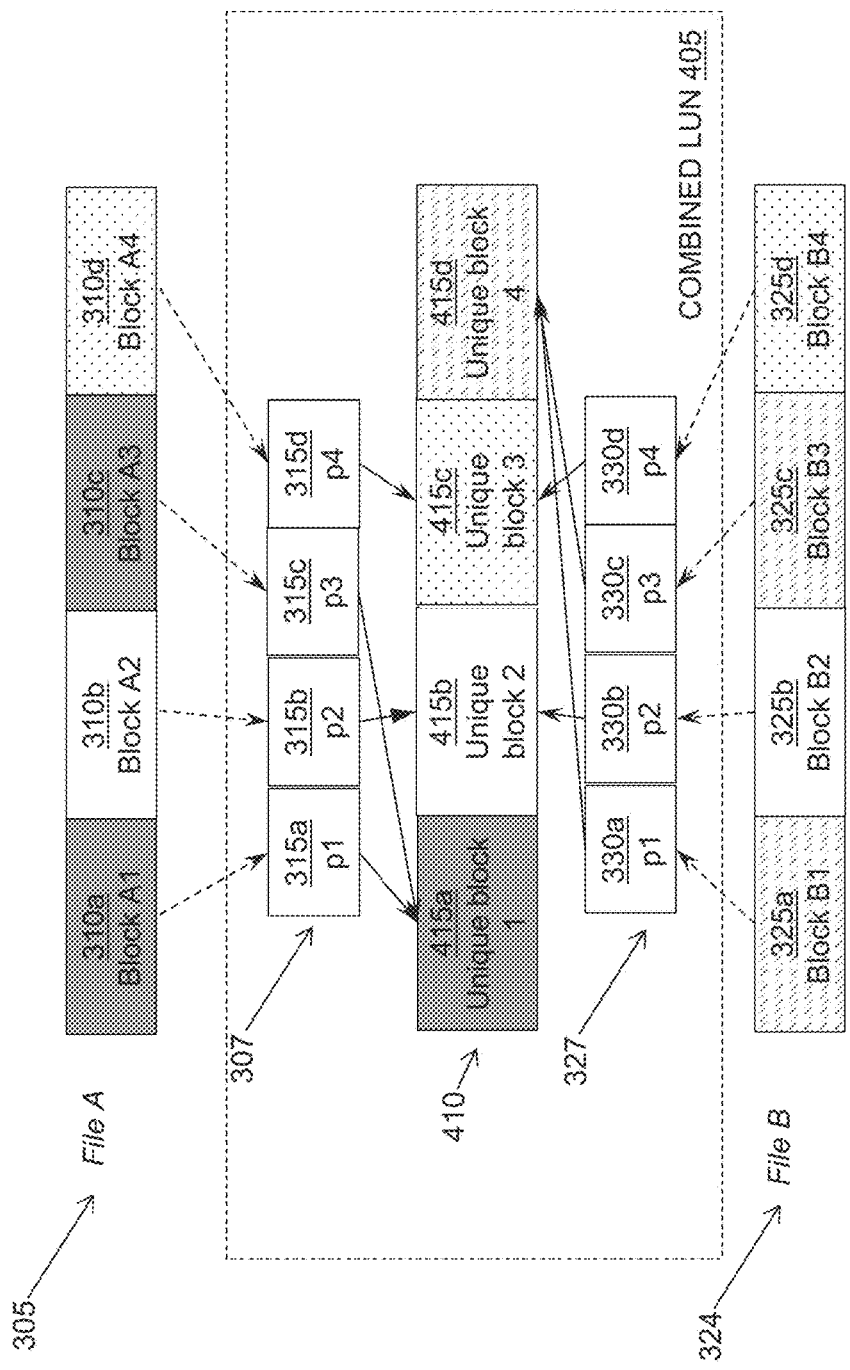
FIG. 4 illustrates a combined LUN resulting from joining the LUNs of FIG. 3 in accordance with the technology.

FIG. 4 illustrates combined LUN 405 resulting from joining LUN 207a and LUN 207d of FIG. 3 in accordance with the technology. As illustrated, LUN 405 includes unique data block pool 410 containing unique data blocks 415a-415d. As illustrated, unique data block pool 410 can be formed by including an instance of each unique data block in unique data block pool 322 and unique data block pool 332 (excluding duplicate data blocks). For example, unique data block pool 410 includes unique data block 415a which is the same as unique data block 320a from unique data block pool 322. Unique data block pool 410 includes unique data block 415b which is the same as unique data block 320b from unique data block pool 322 and unique data block 335b from unique data block pool 332. Unique data block pool 410 includes unique data block 415c which is the same as unique data block 320c from unique data block pool 322 and unique data block 335c from unique data block pool 332. Unique data block pool 410 includes unique data block 415d which is the same as unique data block 335a from unique data block pool 332. Accordingly, the technology can facilitate storage space efficiency by combining LUNs with similar unique block data pools. By combining the unique data block pools of the LUNs, the technology can replace the two unique data block pools with a combined unique data block pool that is smaller (e.g., by leveraging the redundancies in the separate unique data block pools).

Figure 5:
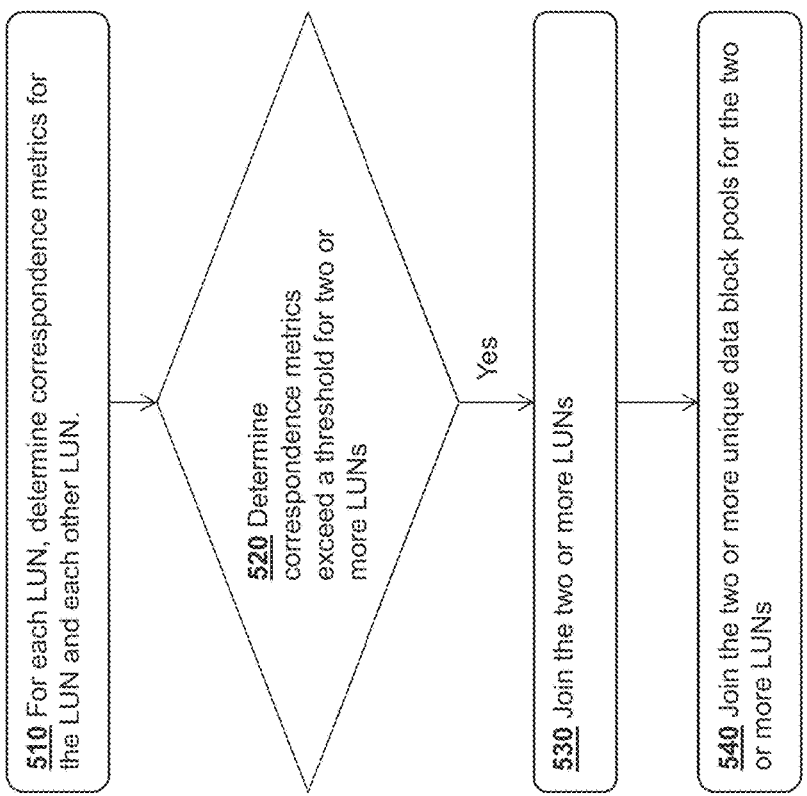
FIG. 5 depicts a flow chart illustrating a method in accordance with the technology.

FIG. 5 depicts a flow chart illustrating a method in accordance with the technology. At step 510, correspondence metrics are determined for a plurality of deduplicated LUNs. For example, for each LUN on a storage system, the storage system can determine a correspondence metric (e.g., the correspondence described above) for the LUN and each other LUN on the storage system. In this manner, a particular LUN's correspondence with each other LUN on the storage system can be determined. In some embodiments, the correspondence metrics can be determined for a subset of the LUNs on the storage system. At step 520, it is determined whether the correspondence metrics for two or more LUNs exceed a threshold. For example, the storage system can determine, for a first LUN, each other LUN on the system for which the first LUN's correspondence metric exceed a threshold (e.g., 50%). The storage system can determine no other LUNs meet these criteria, one other LUN meets this criteria, or multiple other LUNs meet this criteria. If two or more LUNs have correspondence metrics that exceed the threshold, the method proceeds to step 530. At step 530, the storage system joins the two or more LUNs (e.g., as described with respect to FIGS. 3 and 4). In some implementations, two or more LUNs can be joined to form a combined LUN that is a new LUN. In some implementations, two or more LUNs can be joined such that the data from the two or more LUNs is moved to one of the two or more LUNs. At step 540, the storage system joins the two or more unique data block pools for the two or more LUNs (e.g., as described with respect to FIGS. 3 and 4).

The technology can be used in varied applications. As a first exemplary application, the technology can determine LUNs that when joined can provide storage space savings. As an example, a storage system (e.g., storage system 110 of FIG. 1) can include multiple LUNs (e.g., LUN 207a-LUN 207d) that are not deduplicated. At the time deduplication is started, the technology can analyze the unique data block pool for each of the LUNs to determine if space efficiency gains can be achieved by joining LUNs. For example, the technology can determine that the unique data block pool of LUN 207a, the unique data block pool of LUN 207b, and the unique data block pool of LUN 207c correspond at or above a threshold (e.g., 50%). In some implementations, the technology can then cause the storage system to join LUNs 207a, 207b, and 207c. In some implementations, the technology can present the option to join the LUNs to, e.g., a system administrator to allow the system administrator to determine whether to proceed with joining the LUNs. It should be appreciated that the technology can determine other combinations of LUNs to join or determine that joining LUNs would not facilitate storage efficiency (e.g., when no two unique data block pools has correspondence greater than the threshold).

In a second exemplary application, the technology can in real-time or periodically (e.g., once per hour, once per day, once per week, etc.) monitor the level of correspondence between the unique data block storage pools for separate LUNs. If the technology determines the correlation between the unique data block pools for two or more LUNs exceeds a threshold, the technology can cause the storage system to join the LUNs. In some implementations, the technology can alert a system administrator that the LUNs can be joined for space efficiency gains.

In another exemplary application, the technology can facilitate efficient provisioning of LUNs when migrating data for, e.g., separate application to the storage system from another computer system. Separate LUNs can be created for each application with deduplication enabled. As described above, the technology can facilitate joining LUNs to achieve storage space efficiency gains. In some implementations, the technology can analyze the data for each application before copying it to the storage system to determine whether placing the data for any of the applications on the same LUN can provide space efficiency gains. For example, the technology can execute on a server that has access to each application's data (e.g., the data for each application is stored on separate NAS). The technology can deduplicate the data for each application to create unique data block lists for each application's data. The technology can determine the correspondence between the unique data block lists. If any of the unique data block lists have a correspondence above a threshold, the technology can determine combining the data for the applications on a single LUN can provide space efficiency gains. In some implementations, the technology can generate an executable script that will cause the storage system to provision LUNs accordingly and transfer the data for the applications to the storage system. In some implementations, the technology can provide a recommendation to the system administrator on how to allocate LUNs for the applications.

In still another exemplary application, the technology can facilitate assigning, for example, applications (e.g., user programs) to utilize LUNs in an efficient manner. The technology can determine the correspondence between the unique data block pools for two LUNs, each being utilized by a separate application. If the unique data block pools of the LUNs have a correspondence above a threshold, the technology can determine assigning both applications to the same LUN can provide space efficiency gains. The technology can assign both applications to utilize a single LUN. For example, a first application can be assigned to utilize a first LUN and a second application can be assigned to utilize a second LUN. If the unique data block pools of the first LUN and the second LUN have a correspondence above a threshold, the technology can determine assigning both applications to the second LUN can provide space efficiency gains. The first application can be assigned to utilize the second LUN, and the second application can continue to utilize the second LUN. Beneficially, in some implementations, it is unnecessary to join the first LUN and the second LUN, and storage space of the first LUN can be reclaimed for other uses.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback, and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Devices of a computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device includes, for example, a Blackberry® from Research in Motion, an iPhone® from Apple Corporation, and/or an Android™-based device.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A storage system comprising:
   a first storage processor;
   one or more disk enclosures comprising a plurality of disk units forming a plurality of deduplicated logical units (LUNs), wherein the disk enclosure is in data communication with the first storage processor;
   wherein the first storage processor is configured to:
      maintain a first unique data block pool for a first LUN of the plurality of LUNs, the first unique data block pool comprising a first plurality of unique data blocks for representing data stored on the first LUN, wherein maintaining the first unique data block pool includes mapping at least two different logical addresses of the first LUN to both be backed by a single unique data block of the first plurality of unique data blocks;
      maintain a second unique data block pool for a second LUN of the plurality of LUNs, the second unique data block pool comprising a second plurality of unique data blocks for representing data stored on the second LUN, wherein maintaining the second unique data block pool includes mapping at least two different logical addresses of the second LUN to both be backed by another single unique data block of the second plurality of unique data blocks;
      determine that a metric of correspondence between the first unique data block pool and the second unique data block pool exceeds a pre-determined threshold;
      join the first LUN and the second LUN to form a first combined LUN; and
      join the first unique data block pool and the second unique data block pool to form a third unique data block pool comprising a unique data block for each unique data block from a set of data blocks comprising the first plurality of unique data blocks and the second plurality of unique data blocks, the third unique data block pool comprising fewer unique data blocks than the first unique data block pool and the second unique data block pool combined.

2. The storage system of claim 1, wherein the first storage processor is configured to:
   maintain a fourth unique data block pool for a fourth LUN of the plurality of LUNs, the fourth unique data block pool comprising a fourth plurality of unique data blocks for representing data stored on the fourth LUN;
   determine a correspondence metric for the third unique data block pool and the fourth unique data block pool exceeds the pre-determined threshold;
   join the first combined LUN and the fourth LUN to form a second combined LUN; and
   join the third unique data block pool and the fourth unique data block pool.

3. The storage system of claim 1, wherein the first storage processor is configured to maintain the first unique data block pool for the first LUN in response to receiving data for writing to the first LUN.

4. The storage system of claim 1, wherein the first storage processor is configured to maintain the first unique data block pool for the first LUN in response to a periodic trigger.

5. The storage system of claim 1, wherein the first storage processor is configured to join the first LUN and the second LUN, and join the first unique data block pool and the second unique data block pool in response to user input.

6. The storage system of claim 1, wherein the pre-determined threshold is 50%.

7. The storage system of claim 1, wherein the storage processor is further configured to:
   determine a first utilization of the first LUN;
   determine a second utilization of the second LUN; and
   join the first LUN and the second LUN to form the first combined LUN provided that the first utilization is below a first utilization threshold and the second utilization is below a second utilization threshold.

8. A storage system implemented method comprising:
   accessing, by the storage system, a first unique data block pool for a first LUN of a plurality of deduplicated LUNs, the first unique data block pool comprising a first plurality of unique data blocks for representing data stored on the first LUN, at least two logical addresses of the first LUN both being backed by a single unique data block of the first plurality of unique data blocks;

accessing, by the storage system, a second unique data block pool for a second LUN of the plurality of LUNs, the second unique data block pool comprising a second plurality of unique data blocks for representing data stored on the second LUN, at least two logical addresses of the second LUN both being backed by another single unique data block of the second plurality of unique data blocks;

determining, by the storage system, that a metric of correspondence between the first unique data block pool and the second unique data block pool exceeds a pre-determined threshold;

joining, by the storage system, the first LUN and the second LUN to form a first combined LUN; and joining, by the storage system, the first unique data block pool and the second unique data block pool to form a third unique data block pool comprising a unique data block for each unique data block from a set of data blocks comprising the first plurality of unique data blocks and the second plurality of unique data blocks, the third unique data block pool comprising fewer unique data blocks than the first unique data block pool and the second unique data block pool combined.

9. The method of claim 8, further comprising:

accessing, by the storage system, a fourth unique data block pool for a fourth LUN of the plurality of LUNs, the fourth unique data block pool comprising a fourth plurality of unique data blocks for representing data stored on the fourth LUN;

determining, by the storage system, a correspondence metric for the third unique data block pool and the fourth unique data block pool exceeds the pre-determined threshold;

joining, by the storage system, the first combined LUN and the fourth LUN to form a second combined LUN; and joining, by the storage system, the third unique data block pool and the fourth unique data block pool.

10. The method of claim 8, wherein joining the first LUN and the second LUN, and joining the first unique data block pool and the second unique data block pool is in response to user input.

11. The method of claim 8, wherein the pre-determined threshold is 50%.

12. The method of claim 8, further comprising:

determining, by the storage system, a first utilization of the first LUN;

determining, by the storage system, a second utilization of the second LUN; and joining, by the storage system, the first LUN and the second LUN to form the first combined LUN provided that the first utilization is below a first utilization threshold and the second utilization is below a second utilization threshold.

13. The method of claim 8 wherein:

determining that the metric of correspondence between the first unique data block pool and the second unique data block pool exceeds the pre-determined threshold includes:

calculating the metric of correspondence to be a measure of overlap between the first plurality of unique data blocks and the second plurality of unique data blocks and determining that the calculated metric of correspondence exceeds the pre-determined threshold;

joining the first LUN and the second LUN to form the first combined LUN is performed in response to determining that the metric of correspondence between the first unique data block pool and the second unique data block pool exceeds the pre-determined threshold; and joining the first unique data block pool and the second unique data block pool to form the third unique data block pool is performed in response to determining that the metric of correspondence between the first unique data block pool and the second unique data block pool exceeds the pre-determined threshold.

14. The method of claim 8 wherein:

determining is performed after accessing the first unique data block pool and after accessing the second unique data block pool;

the method further comprises individually deduplicating each of the first LUN and the second LUN prior to determining.

15. The method of claim 8 wherein joining the first unique data block pool and the second unique data block pool to form the third unique data block pool includes merging the first unique data block pool and the second unique data block pool, excluding duplicate entries.

16. A storage system implemented method comprising:

accessing, by the storage system, a first unique data block pool for a first LUN of a plurality of deduplicated LUNs, the first LUN utilized by a first application, and the first unique data block pool comprising a first plurality of unique data blocks for representing data stored on the first LUN;

accessing, by the storage system, a second unique data block pool distinct from the first unique data block pool for a second LUN distinct from the first LUN of the plurality of LUNs, the second LUN utilized by a second application to the exclusion of the first application, and the second unique data block pool comprising a second plurality of unique data blocks for representing data stored on the second LUN, the second application being configured not to access the first LUN;

determining, by the storage system, that a metric of correspondence between the first unique data block pool and the second unique data block pool exceeds a pre-determined threshold; and assigning, by the storage system, the first application to utilize the second LUN.

17. The method of claim 16, further comprising:

moving, by the storage system, data associated with the first application to the second LUN; and joining, by the storage system, the first unique data block pool and the second unique data block pool to form a third unique data block pool comprising a unique data block for each unique data block from a set of data blocks comprising the first plurality of unique data blocks and the second plurality of unique data blocks.

18. The method of claim 16, further comprising:

determining, by the storage system, a first utilization of the first LUN;

determining, by the storage system, a second utilization of the second LUN; and assigning, by the storage system, the first application to utilize the second LUN provided that the first utilization is below a first utilization threshold and the second utilization is below a second utilization threshold.

* * * * *